United States Patent
Laine et al.

(10) Patent No.: US 10,682,994 B2
(45) Date of Patent: Jun. 16, 2020

(54) CONTROL SYSTEM AND METHOD FOR AN ARTICULATED VEHICLE COMPRISING AN AUTONOMOUS EMERGENCY BRAKING SYSTEM

(71) Applicant: VOLVO TRUCK CORPORATION, Göteborg (SE)

(72) Inventors: Leo Laine, Härryda (SE); Fredrik Sandblom, Mölndal (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 170 days.

(21) Appl. No.: 15/772,398

(22) PCT Filed: Nov. 2, 2016

(86) PCT No.: PCT/EP2016/076432
§ 371 (c)(1),
(2) Date: Apr. 30, 2018

(87) PCT Pub. No.: WO2017/076908
PCT Pub. Date: May 11, 2017

(65) Prior Publication Data
US 2018/0319382 A1 Nov. 8, 2018

Related U.S. Application Data

(63) Continuation-in-part of application No. PCT/EP2015/075623, filed on Nov. 3, 2015.

(30) Foreign Application Priority Data

Nov. 3, 2015 (WO) ................. PCT/EP2015/075623

(51) Int. Cl.
*B60T 8/1763* (2006.01)
*B60T 8/17* (2006.01)
(Continued)

(52) U.S. Cl.
CPC .............. *B60T 8/1763* (2013.01); *B60T 7/20* (2013.01); *B60T 8/1708* (2013.01);
(Continued)

(58) Field of Classification Search
CPC ........ B60T 7/20; B60T 8/1763; B60T 8/1708; B60T 8/1761; B60T 8/1887; B60T 8/248;
(Continued)

(56) References Cited

U.S. PATENT DOCUMENTS 5,249,851 A   10/1993   Johnsen
7,413,266 B2*  8/2008   Lenz .................. B60T 8/248
                                                     303/150
(Continued)

FOREIGN PATENT DOCUMENTS

| DE | 102012000783 A1 | 7/2013 |
| EP | 1571058 B1 | 8/2007 |
| WO | 2007008150 A1 | 1/2007 |

OTHER PUBLICATIONS

International Search Report (dated Jan. 24, 2017) for corresponding International App. PCT/EP2016/076432.

*Primary Examiner* — Thomas W Irvin
(74) *Attorney, Agent, or Firm* — Venable LLP; Jeffri A. Kaminski

(57) ABSTRACT

A control system is provided for an articulated vehicle including a towing vehicle, a trailer and an autonomous emergency braking system, wherein the control system includes: a brake control arrangement adapted to apply a friction-estimating braking; a brake force capacity estimation arrangement adapted to estimate the brake force capacity of the vehicle as a function of longitudinal wheel slip based on the applied friction-estimating braking; an axle load estimation arrangement adapted to estimate the normal force on each wheel axle of the vehicle; a friction estimation arrangement adapted to estimate a friction coefficient based (Continued)

on the estimated brake force capacity and at least one of the estimated normal forces; and a brake strategy adaptation arrangement configured to adapt the brake strategy of the autonomous emergency braking system by adjusting the brake force for at least one wheel axle of the Vehicle based on the estimated friction coefficient and the at least one wheel axle's estimated normal force.

20 Claims, 4 Drawing Sheets

(51) Int. Cl.
| | |
|---|---|
| *B60T 7/20* | (2006.01) |
| *B60T 8/1761* | (2006.01) |
| *B60T 8/18* | (2006.01) |
| *B60T 8/24* | (2006.01) |

(52) U.S. Cl.
CPC ........ *B60T 8/1761* (2013.01); *B60T 8/1887* (2013.01); *B60T 8/248* (2013.01); *B60T 2201/16* (2013.01); *B60T 2230/06* (2013.01); *B60T 2240/06* (2013.01)

(58) Field of Classification Search
CPC ............ B60T 2201/16; B60T 2230/06; B60T 2240/06
See application file for complete search history.

(56) References Cited

U.S. PATENT DOCUMENTS

| | | | |
|---|---|---|---|
| 9,162,659 B2* | 10/2015 | Morselli | ............... B60T 8/1708 |
| 10,029,660 B2* | 7/2018 | Buchner | ................... B60T 7/20 |
| 10,377,356 B2* | 8/2019 | Eckert | ................... B60T 8/1708 |
| 2010/0063702 A1* | 3/2010 | Sabelstrom | ............... B60T 7/20 |
| | | | 701/70 |
| 2013/0191000 A1* | 7/2013 | Hahne | .............. G08G 1/096725 |
| | | | 701/70 |
| 2019/0322273 A1* | 10/2019 | Wu | .......................... B60T 7/20 |

* cited by examiner

CONTROL SYSTEM AND METHOD FOR AN ARTICULATED VEHICLE COMPRISING AN AUTONOMOUS EMERGENCY BRAKING SYSTEM

BACKGROUND AND SUMMARY

The invention relates to a control system and method for an articulated vehicle comprising a towing vehicle, a trailer and an autonomous emergency braking system. The invention can for example be applied in heavy-duty vehicles, such as trucks, buses and construction equipment.

An autonomous emergency braking (AEB) system, which may also be referred to as an advanced emergency braking system (AEBS), is an autonomous road vehicle safety system that monitors the traffic situation ahead of and that automatically apply the vehicle's brakes when certain conditions are fulfilled in order to avoid or mitigate accidents.

The current AEBS assumes a fixed brake-force and uses the same brake strategy regardless of road conditions, and the current AEBS could cause jack-knifing swing-out when the AEBS brakes an articulated vehicle comprising a towing vehicle and a trailer. Jack-knifing means the folding of the articulate vehicle such that it resembles the acute angle of a folding pocket knife. Swing-out, or trailer swing, is when the trailer skids to one side.

It is desirable to provide an improved control system and method for an articulated vehicle comprising an autonomous emergency braking system, which control system and method in particular may assure that the articulated vehicle can perform automated emergency braking without jack-knifing or swing-out during the AEBS braking.

According to the first aspect of the invention, there is provided a control system for an articulated vehicle comprising a towing vehicle, a trailer and an autonomous emergency braking system, wherein the control system comprises: brake control means adapted to apply a friction-estimating braking; brake force capacity estimation means adapted to estimate the brake force capacity of the vehicle as a function of longitudinal wheel slip based on the applied friction-estimating braking; axle load estimation means adapted to estimate the normal force on each wheel axle of the vehicle; friction estimation means adapted to estimate a friction coefficient based on the estimated brake force capacity and at least one of the estimated normal forces; and brake strategy adaptation means configured to adapt the brake strategy of the autonomous emergency braking system by adjusting the brake force for at least one wheel axle of the vehicle based on the estimated friction coefficient and the at least one wheel axle's estimated normal force.

The present invention is based on the understanding that by taking into account both current road friction and the normal force for each wheel axle, the brake force for one or more axle may be adjusted to avoid over or under usage of the vehicle's brakes, which may prevent jack-knifing or swing-out during AEBS intervention.

For preventing swing-out of the trailer, which for example may occur if the trailer is empty or lightly loaded, the brake strategy adaptation means may adapt the brake strategy such that over usage of the trailer's brakes is avoided. This may be achieved by reducing the brake force for each wheel axle of the trailer, in order to have some lateral tyre force "left" for the trailer. The brake force may be reduced compared to the original or default brake strategy.

For preventing jack-knifing of the articulated vehicle, the brake strategy adaptation means may adapt the brake strategy such that under usage of the trailer's brakes is avoided. This may be achieved, by increasing the brake force for each wheel axle of the trailer, for example such that (pushing) coupling forces between the towing vehicle and the trailer are reduced or eliminated. Alternatively or complementary, the brake force on the towing vehicle may be reduced. The brake force may be increased/reduced compared to the original or default brake strategy.

The trailer may comprise at least two heel axles, wherein the axle load estimation means is adapted to summarize the normal forces on the trailer's wheel axles, and wherein the brake strategy adaptation means is configured to adapt the brake strategy of the autonomous emergency braking system by adjusting the brake force for the trailer's wheel axles collectively based on the summarized normal forces. This is useful in case the it is not possible to brake the trailer axles individually. For a vehicle whose axes can be braked individually, the brake strategy adaptation means could individually adjust the brake force for each wheel axle.

A value representing the normal force on each wheel axle of the vehicle may be provided by an air bellow suspension system of the vehicle. The axle load estimation means may therefore be connected to, or form part of the air bellow suspension system.

The brake control means may be adapted to apply the friction-estimating braking directly when, or a predetermined time after, the autonomous emergency braking system has initiated a possible intervention. An advantage of this is that the actual road friction at the time and place for this particular intervention may be taken into account. Another advantage is that the friction-estimating braking may function as haptic warning that an autonomous emergency braking system intervention has started. The friction-estimating braking may also be part of a pre-brake phase of the autonomous emergency braking system. Furthermore, since the friction-estimating braking is applied only in conjunction with the autonomous emergency braking system intervention, there is no nuisance fuel consumption increase or brake-disc wear.

The brake control means may be adapted to apply the friction-estimating braking only to one wheel axle of the vehicle. An advantage of this is that the influence of the friction-estimating braking on the vehicle's normal behaviour and stability may be reduced.

The one wheel axle may be a pusher axle or a tare axle of the vehicle, not to lose stability of the vehicle. A pusher axle is a non-powered liftable axle placed immediately in front of drive axle, and a tag axle is a non-powered liftable axle placed behind a drive axle.

The one wheel axle (e.g. the pusher axle or tag axle) may be lifted when the friction-estimating braking is applied, to minimize the negative effect on vehicle stability caused by the friction-estimating braking. Furthermore, less braking force is needed to estimate the brake force capacity. What happens when the wheel is lifted is that the value of the braking force is scaled down which leads to less impact on the vehicle stability and that not high air pressure has to be used for the braking.

The brake force capacity estimation means may further be adapted to: find the optimal longitudinal braking point based on the estimated brake force capacity; and apply a slip margin to the optimal longitudinal braking point, which slip margin reduces the longitudinal braking force used by the autonomous emergency braking system. This to still have a tolerance, e.g. for negotiating a curve.

The slip margin may be set such that an anti-lock braking system (ABS) of the vehicle is not activated when the autonomous emergency braking system brakes the vehicle, and the longitudinal braking force used by the autonomous emergency braking system may be constant. An advantage of this is that the braking will be shorter than ABS active due to the relatively poor performance in today's ABS valves in commercial heavy duty vehicles.

Furthermore, the slip, margin may be increased if it is determined that the vehicle is under-steering, whereby the longitudinal braking force on the front wheel axle of the vehicle is further reduced.

The control system may further comprise an articulation angle measurement means adapted to measure the articulation angle between the towing vehicle and the trailer to detect swing-out or jack-knifing, wherein the brake strategy adaptation means is configured to release the braking of the trailer if swing-out is detected and to increase the braking of the trailer if jack-knifing is detected. This may farther improve the brake strategy.

According to a second aspect of the present invention, there is provided an articulated vehicle comprising a control system according to the first aspect.

According to a third aspect of the present invention, there is provided a control method for an articulated vehicle comprising a towing vehicle, a trailer and an autonomous emergency braking system, which method comprises the steps of: applying a friction-estimating braking; estimating brake force capacity of the vehicle as a function of longitudinal wheel slip based on the applied friction-estimating braking; estimating the normal force on each wheel axle of the vehicle; estimating a friction coefficient based on the estimated brake force capacity and at least one of the estimated normal forces; and adapting the brake strategy of the autonomous emergency braking system by adjusting the brake force for at least one wheel axle based on the estimated friction coefficient, and the at least one wheel axle's estimated normal force. This aspect may exhibit the same or similar features and/or technical effects as the other aspects of the invention.

According to a forth aspect of the present invention, there is provided a computer program comprising program code means for performing the steps of the control method of the third aspect when said program is run on a computer.

According to a fifth aspect of the present invention, there is provided a computer program comprising program code means for performing the steps of the control method of the third aspect when said program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
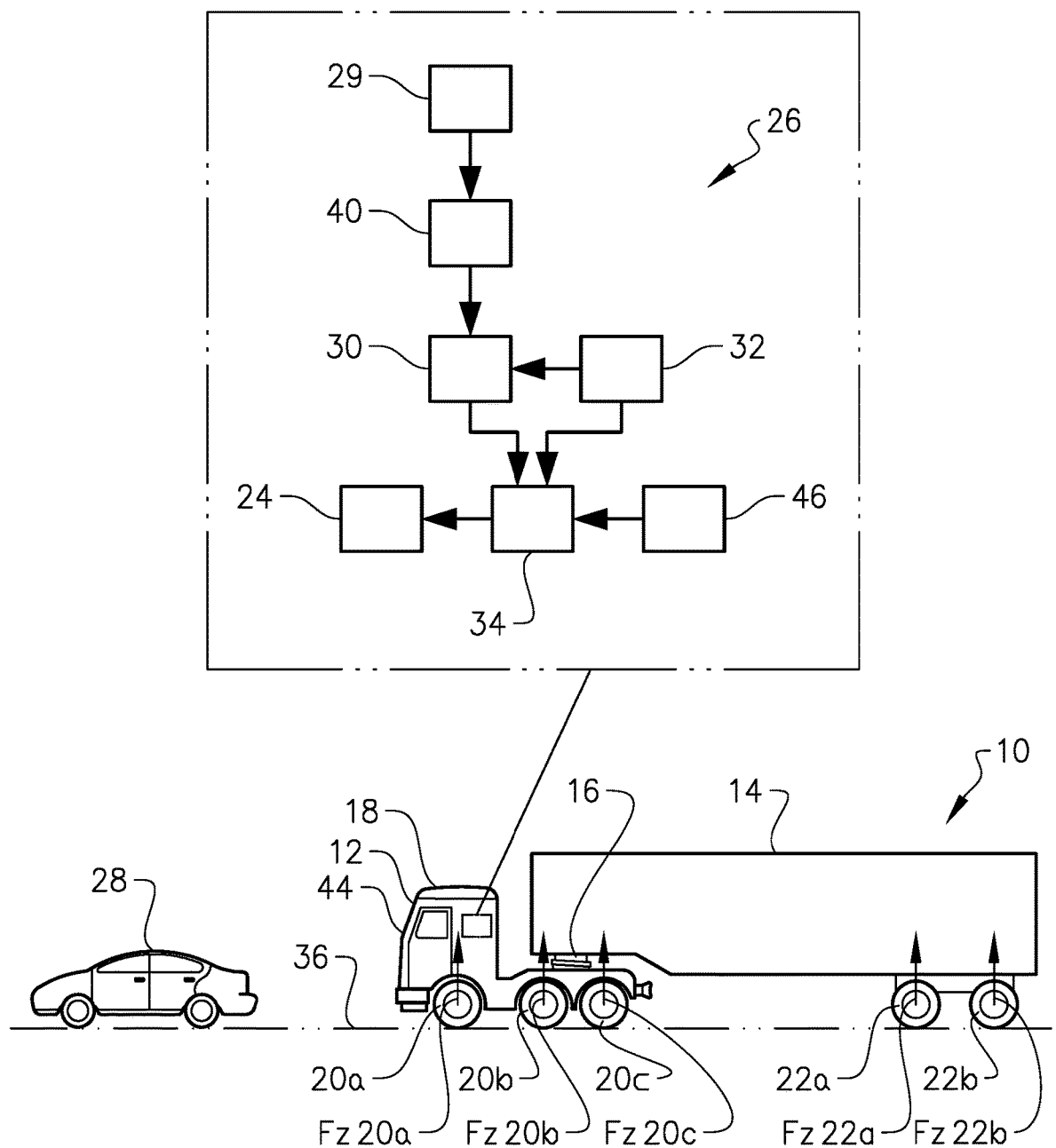
FIG. 1 schematically illustrates a vehicle incorporating aspects of the present invention.

FIG. 1 is a side view of a vehicle 10. The vehicle 10 is a motored road vehicle. In particular, the vehicle 10 is an articulated vehicle. An articulated vehicle is a vehicle which has a pivot joint. The vehicle comprises a towing vehicle 12 and at least one trailer 14. The towing vehicle 12 may be a tractor. The trailer 14 may also be referred to as a semi-trailer. The towing vehicle 12 and the trailer 14 may be connected by a fifth wheel coupling 16. The vehicle 10 has an air bellow suspension system 18.

The towing vehicle in FIG. 1 has a front axle 20a and two rear axles 20b-c. The foremost rear axle 20b may be a non-powered (dead) pusher axle. Alternatively, the rearmost rear axle 20c may be a non-powered tag axle. The (pusher) axle 20b or the (tag) axle 20c may be liftable. The trailer 14 in FIG. 1 has two wheel axles 22a-b.

The vehicle 10 comprises an autonomous emergency braking system 24, and a control system 26.

The autonomous emergency braking system 24 is generally adapted to monitor the traffic situation, ahead of the vehicle 10 and to automatically apply the vehicle's brakes when certain conditions are fulfilled in order to avoid colliding with an object 28 in front of the vehicle 10. The object 28 may be stationary or moving. The object 28 may for example be another vehicle. An intervention of the autonomous emergency braking system 24 may have at least two phases: a collision warning phase and an emergency braking phase. In the collision warning phase, the autonomous emergency braking system 24 may warn the driver of the vehicle 10 of a potential forward collision (i.e. the object 28). In the subsequent emergency braking phase, the autonomous emergency braking system 24 automatically brakes the vehicle 10. The collision warning and emergency braking phases and their timing, duration and/or associated actions tray be referred to as the brake strategy of the autonomous emergency braking system 24.

The control system 26 of the vehicle 10 comprises brake control means 29, brake force capacity estimation means 40, axle load estimation means 32, friction estimation means 30, and brake strategy adaptation means 34. The various means of the control system 18 may be realized by appropriate hardware and/or software.

The brake control means 29 may generally control the brakes of the vehicle 10. In particular, the brake control means 29 is adapted to apply a friction-estimating braking. The friction-estimating braking may be short. The friction-estimating braking, may be performed directly when the autonomous emergency braking system has initiated a possible intervention, e.g. when the collision warning phase begins. Alternatively, the friction-estimating braking may be performed a predetermined short time after the possible intervention is initiated, such as <3 seconds after the collision warning phase begins. Furthermore, the friction-estimating braking may be applied only to a certain wheel axle of the vehicle 10, for example the (pusher) axle 20b or the (tag) axle 20c of the towing vehicle 12. The (pusher) axle 20b or the tag) axle 20c may be lifted when the friction-estimating braking is performed, to minimize the negative effect on vehicle stability.

Figure 2:
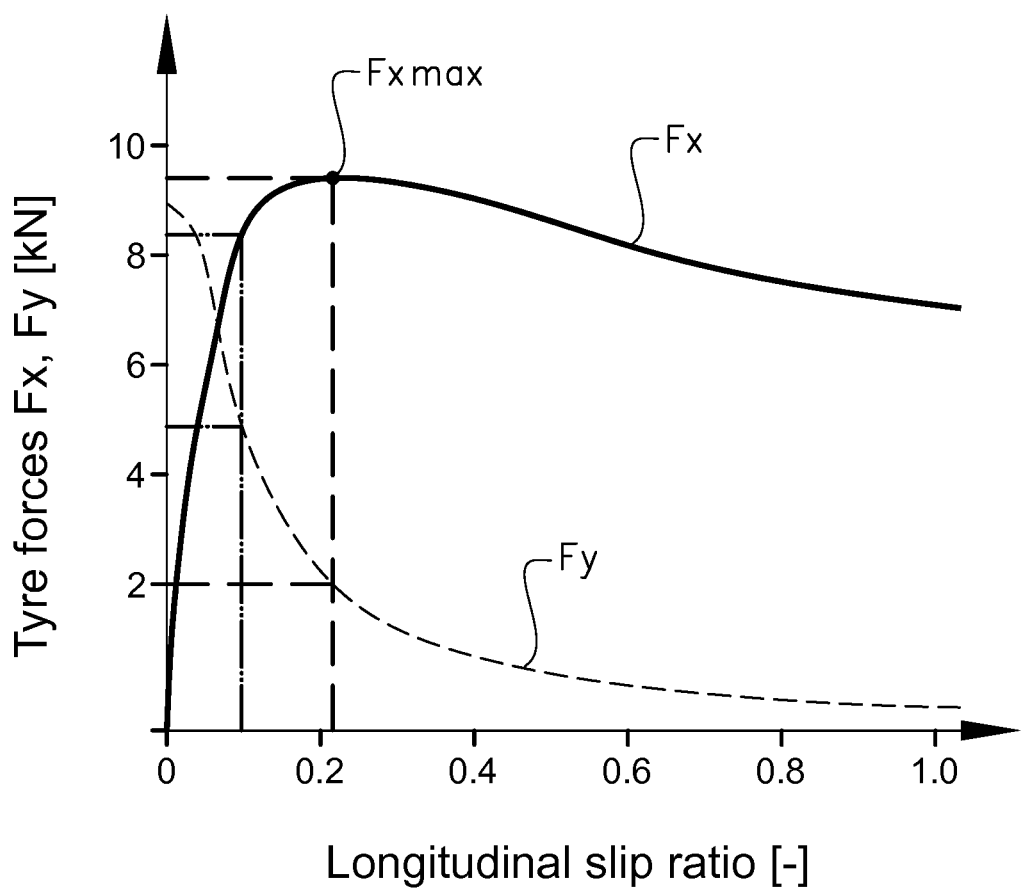
FIG. 2 illustrates tyre forces as function of longitudinal slip.

The brake force capacity estimation means 40 may be connected to the brake control means 29. The brake force capacity estimation leans 40 is adapted to estimate the brake force capacity of the vehicle 10 as a function of longitudinal wheel slip based on the friction-estimating braking applied by the brake control means 29. The estimated brake force may be expressed, as longitudinal tyre force Fx and lateral tyre force Fy as a function longitudinal slip ratio, as show in FIG. 2. In FIG. 2, the vertical axis is tyre forces Fx, Fy [kN], and the horizontal axis is longitudinal slip ratio. Slip is the relative motion between a tyre and the road surface 36 it is moving on. A longitudinal slip ratio of 0 means that the tyre's rotational speed is equal to the free-rolling speed, whereas a longitudinal slip ratio of 1 means that the tyre is locked and just skids along the road surface 36. Fx as a function of slip may be determined based on:

$$Fx = (BrakePressure * ToWheelTorque - (dwheelspeed/dt) * inertiaWheel) / WheelRadius$$

$$slip = *(vx - wheelspeed * WheelRadius)/vx$$

wherein BrakePressure comes from the friction-estimating braking. ToWheelTorque is the brake factor, pressure to gained brake torque [bar/Nm] (dwheelspeed dt is the wheel acceleration, InertiaWheel is the rotational inertia of the studied wheel, and WheelRadius is the radius of the studied wheel. BrakePressure may have the unit [bar], ToWheelTorque may have the unit [Nm/bar], (dwheelspeed/dt) may have the unit [rad/s^2]. InertiaWheel may have the unit [kgm^2], and WheelRadius may have the unit [m]. BrakePressure may be sampled several times during the friction-estimating braking in order to generate the exemplary Fx curve shown in FIG. 2. Fy may be estimated, as shown in FIG. 2.

The axle load estimation means 32 is adapted to estimate the normal force Fz on each wheel axle 20*a-c*, 22*a-b* of the vehicle 10. Normal force Fz values may be provided by the air bellow suspension system 18. The estimation means 32 may therefore be connected to, or form part of, the air bellow suspension system 18. It is appreciated that the normal forces Fz are equal or approximately equal to the axle loads of the vehicle 10.

The friction estimation means 30 may be connected to the brake force capacity estimation means 40 and the axle load estimation means 32. The friction estimation means 30 is adapted to estimate a friction coefficient μ based, on the estimated brake force capacity and at least one of the estimated normal forces. That is, the friction estimation means 30 may estimate the current road-wheel friction. The friction coefficient μ is equal to Fxmax/Fz, wherein Fz is the normal force of the axle which performed the friction-estimating braking.

The brake strategy adaptation means 34 is connected to the friction estimation means 30 and the axle load estimation means 32. The brake strategy adaptation means 34 is configured to adapt the brake strategy of the autonomous emergency braking system 24 by adjusting the brake force for at least one wheel axle 20*a-c*, 22*a-b* based on the friction coefficient μ estimated by the friction estimation means 30 and the at least one wheel axle's normal force Fz estimated by the axle load estimation means 32. The brake strategy adaptation means 34 may for example be configured to adapt the brake strategy of the autonomous emergency braking system by adjusting the brake force for each wheel axle based on the estimated friction coefficient and the wheel axle's estimated normal force.

Figure 3:
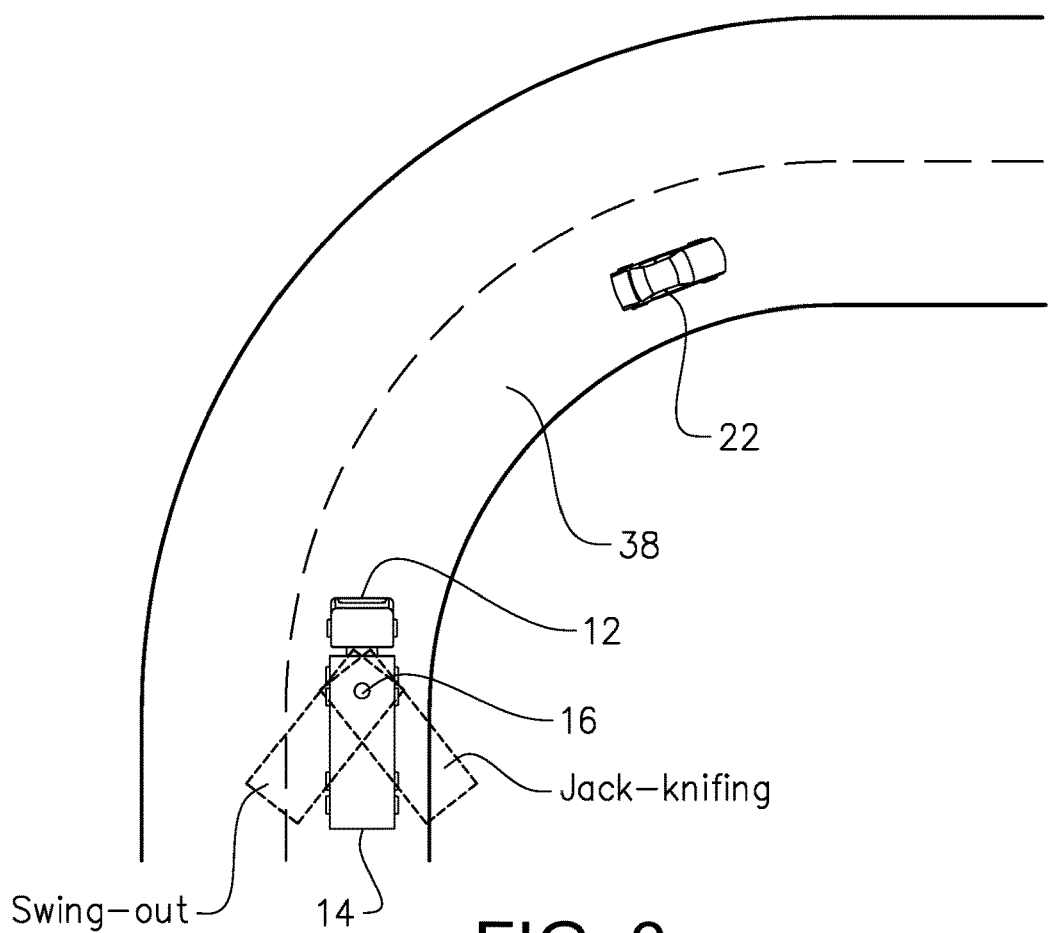
FIG. 3 is a top view of the vehicle of FIG. 1 in a curve.
Figure 4:
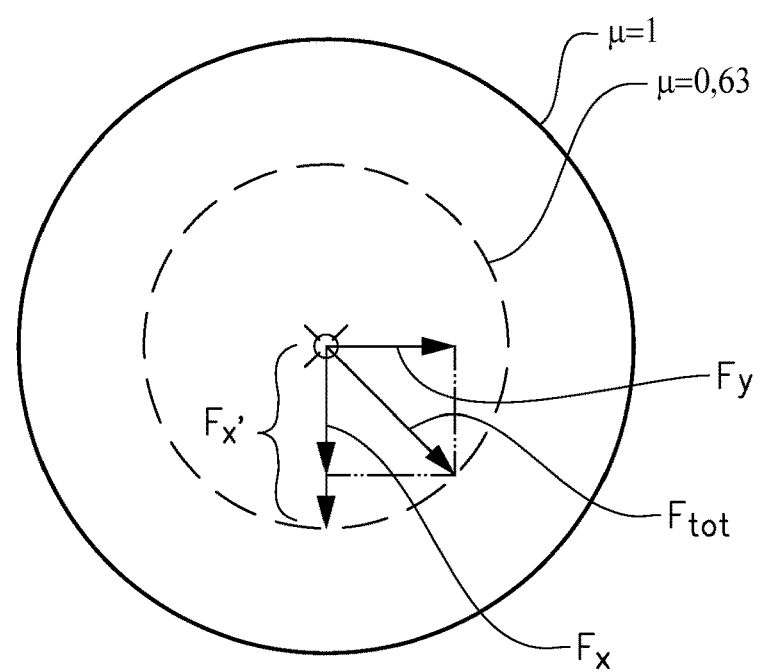
FIG. 4 shows the friction circle.

In a first example, the trailer 14 is empty or lightly loaded, and the estimated normal forces may be Fz20*a*=70 kN, Fz20*b*=15 kN, Fz20*c*=15 kN, Fz22*a*=15 kN, and Fz22*b*=15 kN. Hence, the total normal force of the towing vehicle 12 is 70+15—15=100 kN, whereas the total normal force of the trailer 14 is 15+15=30 kN. If the friction-estimating braking was applied to the last rear axle 20*c* of the tractor 12, this means that the current friction coefficient is about 9.5/15=0.63 (somewhat wet or damp asphalt). The resulting brake forces for the towing vehicle 12 and trailer 14 are then 0.63*100 kN=63 kN and 0.63*30=18.9 kN. Here, over usage of the brakes of the trailer 14 could cause swing-out of the trailer 14, in particular in a curve 38 (see FIG. 3) or in a downhill. To this end, the brake strategy adaptation means 34 may collectively reduce the brake, force for the wheel axles 22*a-b* of the trailer 14. For example, the brake force 18.9 kN for the wheel axles 22*a-b* may be reduced in order to have some lateral tyre force left for the trailer 14. The control system 26 may for example (at least) leave 10-20% of longitudinal force capability to lateral force capability. This is illustrated for one of the wheel axles 22*a-b* in FIG. 2, wherein the longitudinal tyre force EX is reduced from 9.5 to 8.5, whereby the lateral tyre force Fy is increased from about 2 to 5 kN. This may alternatively be illustrated using the tyre friction circle of FIG. 4, wherein the longitudinal tyre force Fx is reduced from Fx' to achieve the lateral tyre force Fy. Furthermore, in FIG. 4, μ*(Fz22*a*+Fz22*b*)=Ftot=√(Fx2+Fy2).

In a second example, the trailer 14 is fully loaded, and the estimated normal forces may be Fz20*a*=70 kN. Fz20*b*=110 kN, Fz20*c*=70 kN, z22*a*=70 kN, and Fz22*b*=70 kN. Hence, the total normal force of the towing vehicle 12 is 70+11+70=250 kN, whereas the total normal force of the trailer 14 is 70+70=140 kN. Here, under usage of the brakes of the trailer 14 could cause jack-knifing of the trailer 14, in particular in the curve 38 or in a downhill, and/or if the road friction is low. To this end, the brake strategy adaptation means 34 may increase the brake force for the wheel axles 22*a-b* of the trailer 14. For example, the brake force for the wheel axles 22*a-b* may be increased such that (pushing) coupling threes between the towing vehicle 12 and the trailer 14 are reduced or eliminated. The coupling forces typically occur at the fifth wheel coupling 16.

Figure 5:
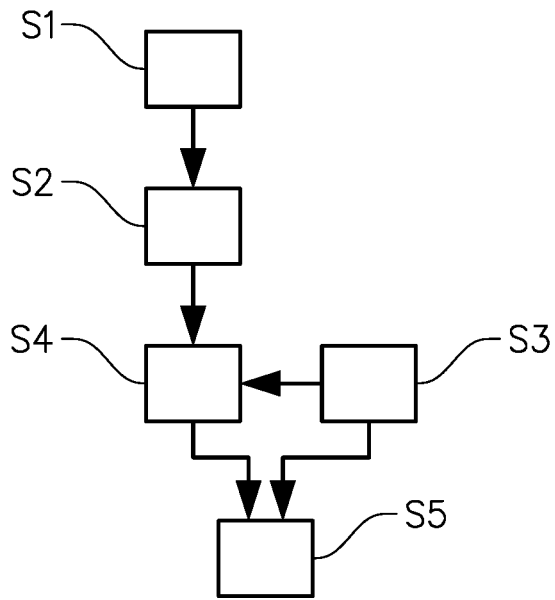
FIG. 5 is a flow chart of a control method according to an embodiment of the present invention.

A control method corresponding to the control system 26 will now be described with further reference to FIG. 5. When the articulated vehicle 10 for example is in curve 38 of FIG. 3 and the autonomous emergency braking system 24 detects object 28 ahead of the vehicle 10, just applying the autonomous emergency braking without first adapting the braking strategy could cause swing-out into the opposite lane or jack-knifing off the road, in particular if the road is slippery.

However, in accordance with the control method, a friction-estimating braking is applied (S1), and the brake force capacity of the vehicle as a function of longitudinal wheel slip is estimated based on the applied friction-estimating braking (S2). Furthermore, the normal force on each wheel axle of the vehicle is, estimated (S3). Then, the friction coefficient μ is estimated based on the estimated brake force capacity and at least one of the estimated normal forces (S4). Then, the brake strategy of the autonomous emergency braking system is adapted by adjusting the brake force for each wheel axle based on the estimated friction coefficient and the wheel axle's estimated normal force (S5), for instance as described above in the first and second examples.

Then, the autonomous emergency braking system 24 may automatically brake the vehicle 10 in accordance with the adapted braking strategy in order to avoid colliding with an object 28 without swing-out or jack-knifing of the trailer 14.

Furthermore, if the autonomous emergency braking system 24 determines, based on the adapted brake strategy, that the vehicle 10 cannot brake to avoid the object 28 (for example the braking distance may be too long or the time to collision (TTC) may be too short), the driver of die vehicle 10 may be alerted that an accident cannot be avoided by braking and that steering is the only option left. The driver may also be assisted in the steering manoeuvre by automatically braking individual wheels of the vehicle 10 to increase yaw motion of the vehicle 10 needed to avoid the object 28.

This may for example be accomplished by reducing the reference yaw rate band (e.g. excluding the deadband) for yaw control of the vehicle 10. Furthermore, if the vehicle 10 is equipped with an electric steer assist system, the initial steering of the steering manoeuvre can be automated and steer the angle of the front axle 20a, and also give the driver steering force feedback to follow the steering manoeuvre to avoid the object 28.

Figure 6:
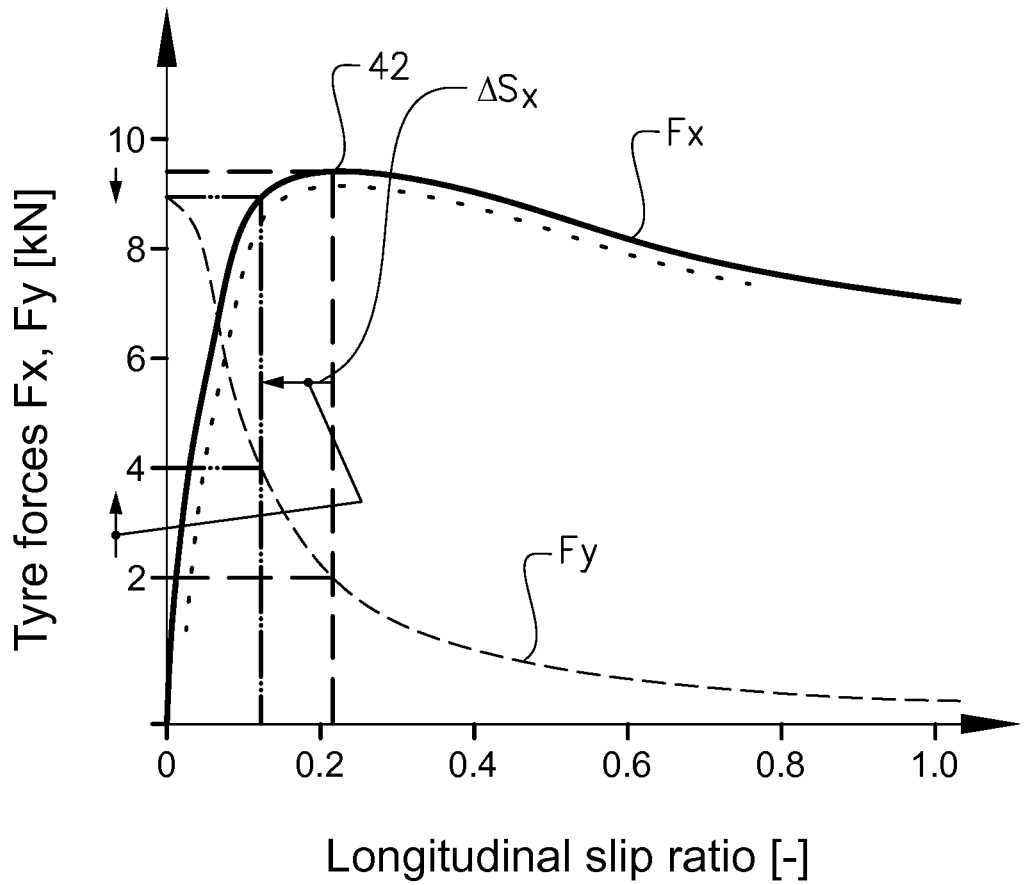
FIG. 6 illustrates tyre forces as function of longitudinal slip with a slip margin.

Referring to FIG. 6, the brake force capacity estimation means 40 may further be adapted to find an optimal longitudinal braking point 42 based on the estimated brake force capacity, and to apply a slip margin ΔSx to the optimal longitudinal braking point. The slip margin ΔSx marginally reduces the longitudinal braking force used by the autonomous emergency braking system 24 from about 9.5 to 9 kN, but on the other hand the lateral force is almost doubled from 2 to 4 kN during autonomous emergency braking. The slip margin for e.g. negotiating a curve may be applied in addition to the above-described reduction for avoiding swing-out. Furthermore, the slip margin ΔSx may be set such that an anti-lock braking system (ABS) 44 of the vehicle 10 is not activated when the autonomous emergency braking system 24 brakes the vehicle 10, whereby the longitudinal braking force used by the autonomous emergency braking system 24 may be constant. The dotted line in FIG. 6 shows that when ABS 44 is activated it pulsates quite slow (e.g. 1 s) between no braking (air released tire free rolling) to full braking (tyre almost locked far beyond optimal braking point 42). Typical slip range for ABS may be 0.05-0.8, Furthermore, the slip margin ΔSx may be increased if it is determined that the vehicle 10 is understeering (i.e. it steers too little according to the lane or driver), whereby the longitudinal braking force on the front wheel axle 20a of the vehicle 10 is further reduced.

The control system 26 may further comprise an articulation angle measurement means 46 adapted to measure articulation angle between the towing vehicle 12 and the trailer 14 to detect swing-out or jack-knifing. To this end, the brake strategy adaptation means 34 may be further configured to release the braking of the trailer 14 if swing-out is detected and to increase the braking of the trailer 14 if jack-knifing is detected. The articulation angle measurement means 46 may for example measure the angle at the fifth wheel coupling 16.

It is to be understood that the present invention is not limited to the embodiments described above and illustrated in the drawings; rather, the skilled person will recognize that many changes and modifications may be made within the scope of the appended claims.

The invention claimed is:

1. A control system for an articulated vehicle comprising a towing vehicle, a trailer and an autonomous emergency braking system, characterized in that the control system comprises:
   brake control means adapted to apply a friction-estimating braking;
   brake force capacity estimation means adapted to estimate the brake force capacity of the vehicle as a function of longitudinal wheel slip based on the applied friction-estimating braking,
   axle load estimation means adapted to estimate the normal force on each wheel axle of the vehicle;
   friction estimation means adapted to estimate a friction coefficient based on the estimated brake force capacity and at least one of the estimated normal forces; and
   brake strategy adaptation means configured to adapt the brake strategy of the autonomous emergency braking system by adjusting the brake force for at least one wheel axle of the vehicle based on the estimated friction coefficient and the at least one wheel axle's estimated normal force,
   wherein longitudinal tire force (Fx) of the estimated brake force is determined based on:

$$Fx=(BrakePressure \times ToWheelTorque-(dwheelspeed/dt) \times InertiaWheel)/WheelRadius,$$

wherein BrakePressure comes from the friction-estimating braking, ToWheelTorque is brake factor, (dwheelspeed/dt) is wheel acceleration, InertiaWheel is the rotational inertia of a studied wheel, and WheelRadius is the radius of the studied wheel.

2. A control system according to claim 1, wherein for preventing swing-out of the trailer, the brake strategy adaptation means is configured to adapt the brake strategy such that over usage of the trailer's brakes is avoided.

3. A control system according to claim 2, wherein the brake strategy adaptation means is configured to adapt the brake strategy by reducing the brake force for each wheel axle of the trailer.

4. A control system according to claim 1, wherein for preventing jack-knifing of the articulated vehicle, the brake strategy adaptation means is configured to adapt the brake strategy such that under usage of the trailer's brakes is avoided.

5. A control system according to claim 4, wherein the brake strategy adaptation means is configured to adapt the brake strategy by increasing the brake force for each wheel axle of the trailer, such that coupling forces between the towing vehicle and the trailer are reduced or eliminated.

6. A control system according to claim 1, wherein the trailer comprises at least two wheel axles, the axle load estimation means is adapted to summarize the normal forces on the trailer's wheel axles, and the brake strategy adaptation means is configured to adapt the brake strategy of the autonomous emergency braking system by adjusting the brake force for the trailer's wheel axles collectively based on the summarized normal forces.

7. A control system according to claim 1, wherein a value of the normal force on each wheel axle of the vehicle is provided by an air bellow suspension system of the vehicle.

8. A control system according to claim 1, wherein the brake control means is adapted to apply the friction-estimating braking directly when, or a predetermined time after, the autonomous emergency braking system has initiated a possible intervention.

9. A control system according to claim 1, wherein the brake control means is adapted to apply the friction-estimating braking only to one wheel axle of the vehicle.

10. A control system according to claim 1, wherein the one wheel axle is a pusher axle or a tag axle of the vehicle.

11. A control system according to claim 9, wherein the one wheel axle is lifted when the friction-estimating braking is applied.

12. A control system according to claim 1, wherein the brake force capacity estimation means is further adapted to:
   find the optimal longitudinal braking point based on the estimated brake force capacity; and
   apply a slip margin to the optimal longitudinal braking point, which slip margin reduces the longitudinal braking force used by the autonomous emergency braking system.

13. A control system according to claim 12, wherein the slip margin is set such that an anti-lock braking system of the vehicle is not activated when the autonomous emergency braking system brakes the vehicle.

14. A control system according to claim 13, the longitudinal braking force used by the autonomous emergency braking system is constant.

15. A control system according to claim 12, wherein the slip margin is increased if it is determined that the vehicle is under-steering, whereby the longitudinal braking force on the front wheel axle of the vehicle is further reduced.

16. A control system according to claim 1, further comprising an articulation angle measurement means adapted to measure the articulation angle between the towing vehicle and the trailer to detect swing-out or jack-knifing, wherein the brake strategy adaptation means is configured to release the braking of the trailer if swing-out is detected and to increase the braking of the trailer if jack-knifing is detected.

17. An articulated vehicle comprising a control system according to claim 1.

18. A control method for an articulated vehicle comprising a towing vehicle, a trailer and an autonomous emergency braking system, which method is characterized by the steps of:
applying a friction-estimating braking;
estimating brake force capacity of the vehicle as a function of longitudinal wheel slip based on the applied friction-estimating braking;
estimating the normal force on each wheel axle of the vehicle;
estimating a friction coefficient based on the estimated brake force capacity and at least one of the estimated normal forces; and
adapting the brake strategy of the autonomous emergency braking system by adjusting the brake force for at least one wheel axle of the vehicle based on the estimated friction coefficient and the at least one wheel axle's estimated normal force
wherein longitudinal tire force (Fx) of the estimated brake force is determined based on:

$$Fx=(BrakePressure \times ToWheelTorque-(dwheelspeed/dt) \times InertiaWheel)/WheelRadius,$$

wherein BrakePressure comes from the friction-estimating braking, ToWheelTorque is brake factor, (dwheelspeed/dt) is wheel acceleration, InertiaWheel is the rotational inertia of a studied wheel, and WheelRadius is the radius of the studied wheel.

19. A computer comprising a computer program for performing the steps of claim 18 when the program is run on the computer.

20. A non-transitory computer readable medium comprising a computer program for performing the steps of claim 18 when the program product is run on a computer.

* * * * *